(12) United States Patent
Johnson et al.

(10) Patent No.: US 10,365,544 B2
(45) Date of Patent: *Jul. 30, 2019

(54) PANORAMIC CAMERA SUPPORT

(71) Applicant: Really Right Stuff, LLC, San Luis Obispo, CA (US)

(72) Inventors: Joseph M. Johnson, San Luis Obispo, CA (US); Verent Chan, San Luis Obispo, CA (US)

(73) Assignee: Really Right Stuff, LLC, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/897,664

(22) Filed: Feb. 15, 2018

(65) Prior Publication Data
US 2018/0239224 A1      Aug. 23, 2018

Related U.S. Application Data

(63) Continuation of application No. 15/582,636, filed on Apr. 29, 2017, now Pat. No. 10,012,890.
(Continued)

(51) Int. Cl.
*G03B 17/56* (2006.01)
*G03B 37/00* (2006.01)
(Continued)

(52) U.S. Cl.
CPC ......... *G03B 17/561* (2013.01); *F16M 11/043* (2013.01); *F16M 11/126* (2013.01);
(Continued)

(58) Field of Classification Search
None
See application file for complete search history.

(56) References Cited

U.S. PATENT DOCUMENTS

| | | | | |
|---|---|---|---|---|
| 2,922,609 | A | * | 1/1960 | Collier ................. F16M 11/126 248/179.1 |
| 3,954,244 | A | * | 5/1976 | Gopstein .................. B23Q 1/54 248/349.1 |

(Continued)

OTHER PUBLICATIONS

Web page www.bhphotovideo.com, Wimberley WH-200 Gimbal Tripod Head II with Quick Release Base, B&H Photo, 6 pgs., at least one year prior to priority date.
(Continued)

*Primary Examiner* — William B Perkey
(74) *Attorney, Agent, or Firm* — Chernoff, Vilhauer, McClung & Stenzel, LLP

(57) ABSTRACT

A support for an imaging device includes a first rotatable assembly supportable by a support that rotates in a generally horizontal plane and a horizontal locking member. The imaging device includes a second rotatable assembly that rotates in a generally vertical plane imaging device includes an interconnection structure that interconnects the first rotatable assembly to the second rotatable assembly such that the second rotatable assembly is rotatable around the first rotatable assembly at an elevation higher than the first rotatable assembly and offset laterally from the first rotatable assembly. imaging device includes the first rotatable assembly including a panning structure that rotates the support in the generally horizontal plane and a leveling base that is rotatable in a non-coplanar manner relative to the panning structure.

13 Claims, 27 Drawing Sheets

Related U.S. Application Data

(60) Provisional application No. 62/330,005, filed on Apr. 29, 2016.

(51) Int. Cl.
  *F16M 11/24* (2006.01)
  *F16M 11/12* (2006.01)
  *F16M 11/04* (2006.01)
  *F16M 11/16* (2006.01)
  *G03B 37/02* (2006.01)

(52) U.S. Cl.
  CPC .......... *F16M 11/16* (2013.01); *F16M 11/242* (2013.01); *G03B 37/00* (2013.01); *G03B 37/02* (2013.01); *F16M 2200/025* (2013.01)

(56) References Cited

U.S. PATENT DOCUMENTS

| | | | | |
|---|---|---|---|---|
| 4,319,825 A * | 3/1982 | Newton | | G03B 17/561 396/422 |
| 4,533,103 A * | 8/1985 | Ina | | F16M 11/126 248/180.1 |
| 4,591,250 A * | 5/1986 | Woodruff | | G03B 17/561 33/334 |
| 5,544,968 A | 8/1996 | Goellner | | |
| 5,708,890 A | 1/1998 | Nakano | | |
| 8,328,359 B2 | 12/2012 | Monroe et al. | | |
| 10,012,890 B2 * | 7/2018 | Johnson, Sr. | | G03B 37/02 |
| 2003/0128975 A1 * | 7/2003 | Shevick | | G03B 37/00 396/428 |
| 2007/0264004 A1 * | 11/2007 | Daggett | | G03B 17/561 396/322 |
| 2010/0079101 A1 * | 4/2010 | Sidman | | F16M 11/041 318/649 |
| 2010/0092165 A1 * | 4/2010 | Cartoni | | F16M 11/10 396/428 |
| 2015/0365572 A1 * | 12/2015 | Fan | | F16M 11/2007 348/36 |
| 2018/0239224 A1 * | 8/2018 | Johnson | | G03B 37/00 |

OTHER PUBLICATIONS

Web page www.bhphotovideo.com, Benro GH2 Aluminum Gimbal Head, B&H Photo, 3 pgs., at least one year prior to priority date.

Web page www.bhphotovideo,comvvvv, Benro GH3 Aluminum Gimbal Head, B&H Photo, 3 pgs., at least one year prior to priority date.

Web page www.bhphotovideo.com, Custom Brackets CB Gimbal Tripod Head, B&H Photo, 3 pgs., at least one year prior to priority date.

Web page www.bhphotovideo.com, ProMediaGear Katana Gimbal Head, B&H Photo, 3 pgs., at least one year prior to priority date.

Web page www.bhphotovideo.com, Kirk G1 Gimbal Head, B&H Photo, 3 pgs., at least one year prior to priority date.

Web page www.bhphotovideo.com, Induro GHB2 Gimbal Head, B&H Photo, 3 pgs., at least one year prior to priority date.

Web page www.bhphotovideo.com, Jobu Design Jobu Jr.3 Deluxe Gimbal Kit with Swing-Arm HM-J3D, B&H Photo, 3 pgs., at least one year prior to priority date.

Web page www.bhphotovideo.com, Jobu Design DMG-HD4 Heavy Duty Gimbal Head MK IV, B&H Photo, 3 pgs., at least one year prior to priority date.

Web page www.bhphotovideo.com, Sirui PH-20 Gimbal Head, B&H Photo, 3 pgs., at least one year prior to priority date.

Web page www.bhphotovideo.com, Jobu Design BWG-J3 Jobu Jr.3 Gimbal Kit with Swing-Arm HM-J2, B&H Photo, 3 pgs. at least one year prior to priority date.

Web page www.bhphotovideo.com, Gepe SK-GH01 Gimbal Head Mount, B&H Photo, 3 pgs. at least one year prior to priority date.

* cited by examiner

Isometric

FRONT

BACK

LEFT

RIGHT

TOP

BOTTOM

LOWER BASE

Leveling Base

Leveling Base

Leveling Base

Leveling Base

Leveling Base

Cross Sectional
View Of Leveling
Base

Vertical Rail

Vertical Knob Assembly

Vertical Rail Isolated

UPPER RAIL KNOB ASSEMBLY

UPPER KNOB EXPLODED VIEW

HEX KEY

PANORAMIC CAMERA SUPPORT

CROSS-REFERENCE TO RELATED APPLICATIONS

This application is a continuation of U.S. patent application Ser. No. 15/582,636, filed Apr. 29, 2017, which application claims the benefit of U.S. Provisional App. No. 62/330,005, filed Apr. 29, 2016.

BACKGROUND OF THE INVENTION

The present invention generally relates to a camera mount, and in particular to a camera mount suitable for taking panoramic pictures.

Aberrations and distortions occur at the edge regions of a wide-angle view of a landscape. Taking and assembling together multiple images across the view results in a panoramic that is larger than is generally available using a single shot picture. Properly aligning film strips or digital images to produce a panoramic picture can be a difficult task. This task is especially difficult if the camera is not properly centered on a rotatable mount.

A panoramic camera is disclosed in Gasso et al., U.S. Pat. No. 2,111,854, that includes an adjustable lens to vary the focal length of the lenses in mathematical proportions to the varying distances of objects in the panoramic view.

Campbell et al., U.S. Pat. No. 3,183,810 disclose a motor-driven panoramic camera having automatic means for stopping the angular sweep of the camera and adjustments for changing the angle of sweep and for making the sweep symmetrical or unsymmetrical.

Blankenhorn, U.S. Pat. No. 1,282,177, discloses a system for making panoramic pictures comprising marking the film as the film is advanced and the camera rotated.

A camera mount useful for taking stereoscopic or panoramic pictures is disclosed by Lanuzzi in U.S. Pat. No. 2,782,700.

What is desired, therefore, is a simplified system for a panoramic device.

DETAILED DESCRIPTION OF PREFERRED EMBODIMENTS

Figure 1:
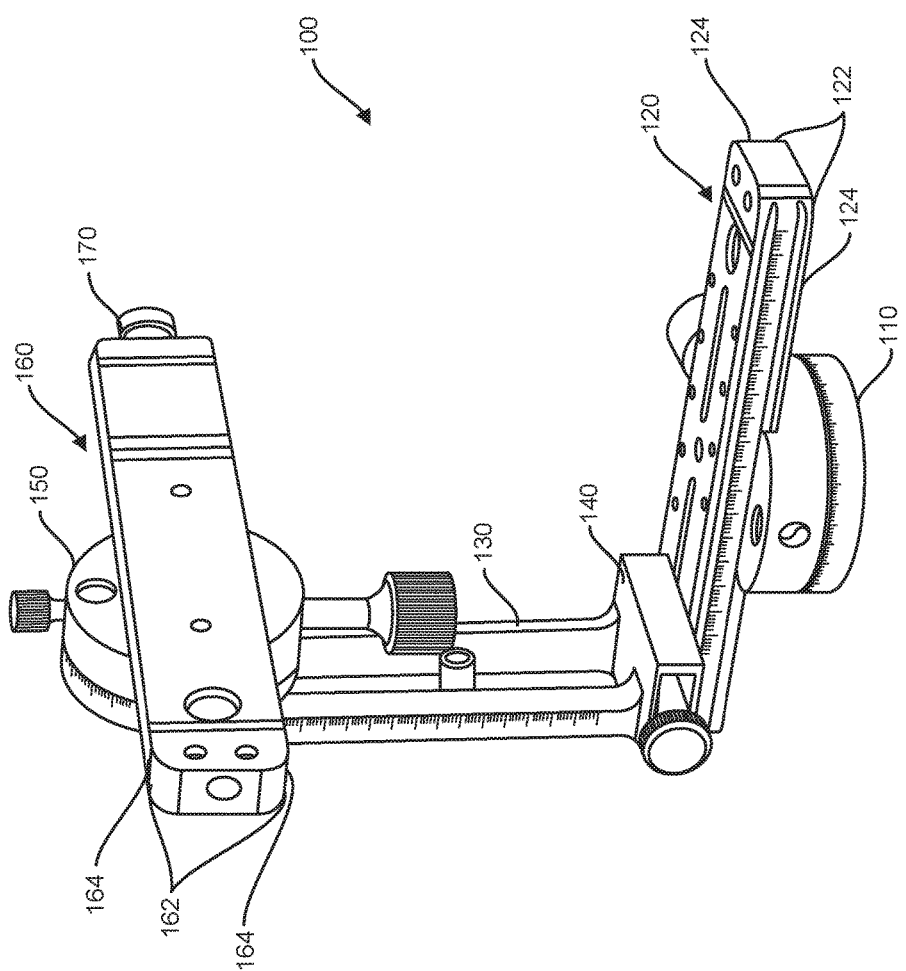
FIG. 1 illustrates a panoramic gimbal device.

Referring to FIG. 1, a panoramic gimbal device 100 may include a first panoramic clamp 110. The first panoramic clamp 110 may include a panning base that is suitable to be supported by a tripod. The first panoramic clamp 110 may include a clamp body and a clamp jaw. The clamp jaw may be biased outwardly from the clamp body by a pair of clamp springs. The clamp jaw is secured in place by a rotatable clamp screw. As the clamp screw is released the clamp jaw will be pressed outwardly thereby opening the clamp jaw and keeping the clamp jaw in tension to maintain it in a suitable position. As the clamp screw is tightened, the clamp jaw will be pressed inwardly thereby closing the clamp jaw and securing any plate or other imaging equipment (e.g., camera, video camera, etc.) therein. The panning base is rotatably engaged with the clamp body and clamp jaw, where rotation of a base screw selectively maintains the panning base and the clamp body from freely rotating with respect to each other. U.S. Pat. No. 9,063,397 describes an exemplary panoramic device, and is incorporated by reference herein in its entirety.

Figure 2:
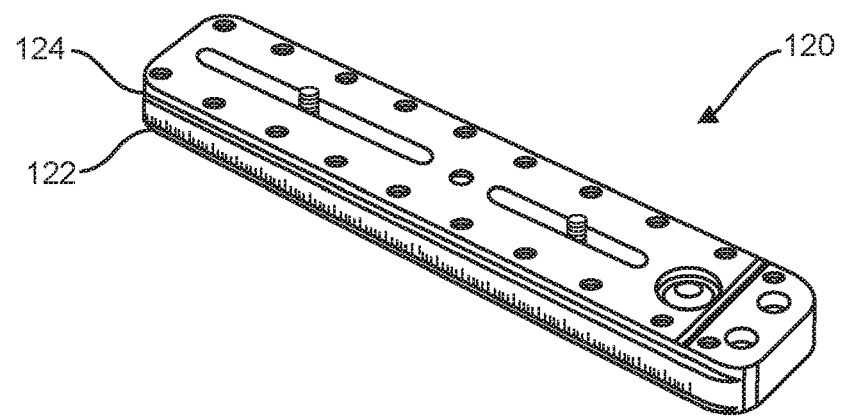
FIG. 2 illustrates a horizontal rail of the gimbal device of FIG. 1.

Referring also to FIG. 2, the panoramic gimbal device 100 may include a horizontal rail 120. The horizontal rail 120 may include a lower pair of opposing grooves 122, which may be detachably engageable with the clamp jaw of the first panoramic clamp 110. The horizontal rail 120 may be horizontally adjusted in its position with respect to the first panoramic clamp 110 by loosening the clamp jaw, repositioning the horizontal rail 120, and tightening the clamp jaw.

Figure 3:
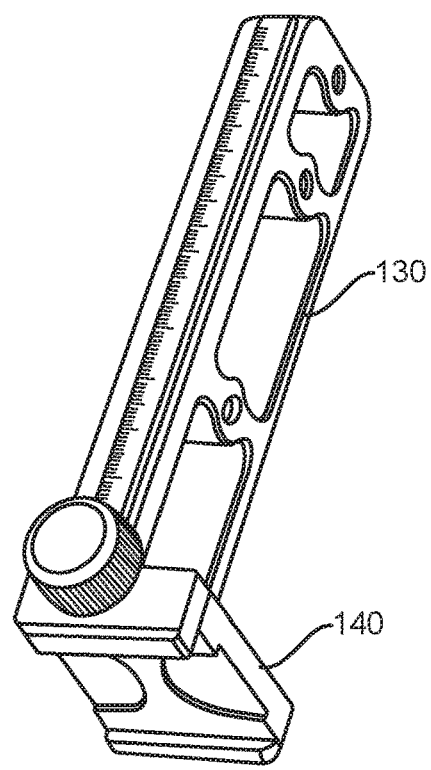
FIG. 3 illustrates a vertical rail of the gimbal device of FIG. 1

Referring also to FIG. 3, the panoramic gimbal device 100 may include a vertical rail 130 that includes a clamping device 140 at the bottom thereof. The horizontal rail 120 may include an upper pair of opposing grooves 124, which may be detachably engageable with the jaws of the clamping device 140. The clamping device 140 and the vertical rail 130 may be horizontally adjusted in its position with respect to the horizontal rail 120 by loosening the jaws of the clamping device 140, repositioning the vertical rail 130, and tightening of the jaws of the clamping device 140. The panoramic gimbal device 100 includes a second panoramic clamp 150. The second panoramic clamp 150 is secured to the vertical rail 130. The second panoramic clamp 150 may be of the same configuration to that of the first panoramic clamp 110.

Figure 4:
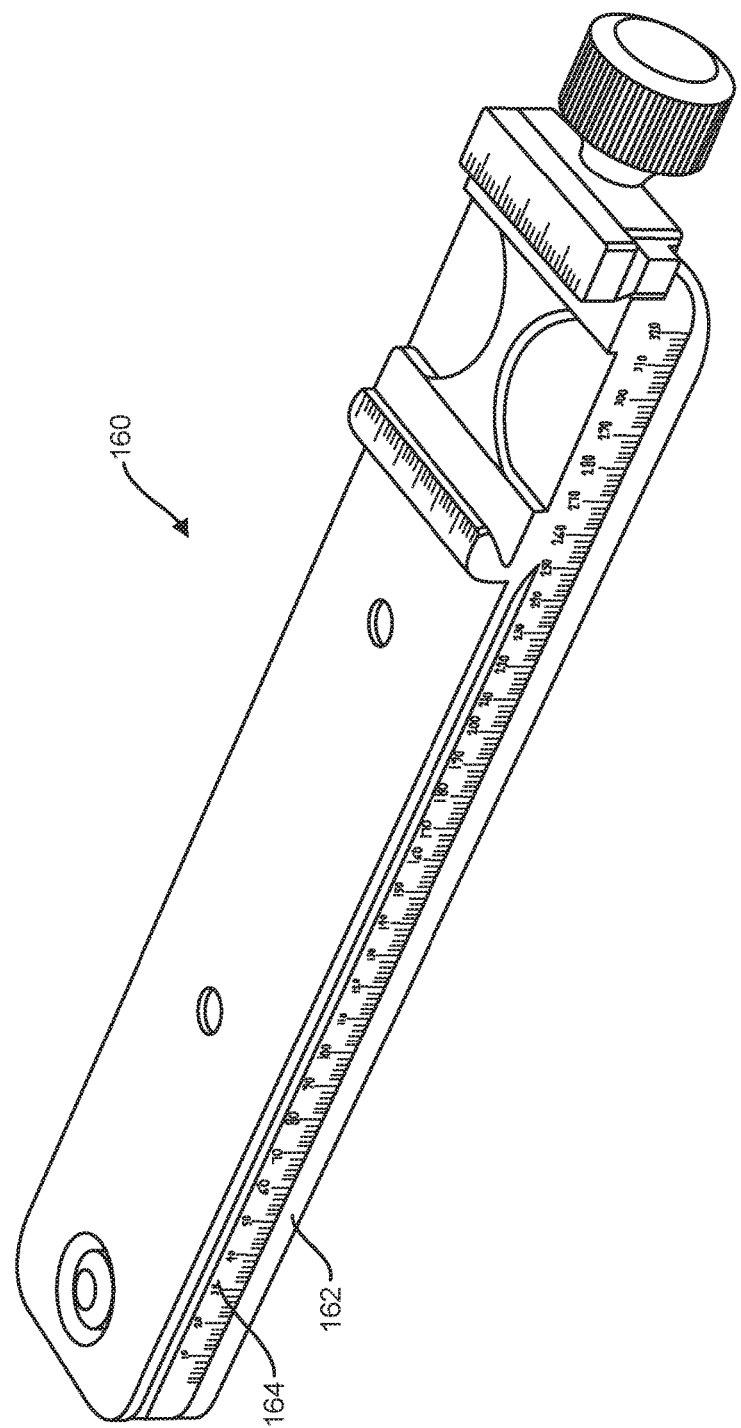
FIG. 4 illustrates a nodal slide of the gimbal device of FIG. 1.

Referring also to FIG. 4, the panoramic gimbal device 100 includes a nodal slide 160. The nodal slide 160 may include a lower pair of opposing grooves 162, which may be detachably engageable with the clamp jaw of the second panoramic clamp 150. The nodal slide 160 may include a clamp 170 at the end thereof. The clamp 170 may be detachably secured to an imaging device, such as a quick release plate attached to the imaging device (e.g., camera). The nodal slide 160 may be adjusted in it position with respect to the second panoramic clamp 150 by loosening the clamp jaw of the second panoramic clamp 140, adjusting the nodal slide 160, and tightening the clamp jaw of the second panoramic clamp 150. The first panoramic clamp 110 may be rotated to align the lens of the camera with the scene to have an image captured. Also, the second panoramic clamp 150 may be rotated so that the lens of the camera is aligned with the scene to have the image captured. Also, the horizontal rail 120 and the nodal slide 160 may be adjusted so that the image sensor is in a suitable location, such as directly above the tripod supporting the panoramic gimbal device 100 to reduce or otherwise eliminate the parallax.

By way of example, shooting a multi-row/multi-column panoramic may include the following steps. The first panning clamp is opened enough so that the horizontal rail can be secured into the panning clamp. A supporting ball head may be loosened so that the ball moves freely, and shift the ball until a large, high contrast spirit level in the horizontal rail indicates level. The ball of the ball head may then be locked down and the first panning clamp base may be secured to prevent rotation. The vertical rail is mounted to the horizontal rail in a manner such that the second panning clamp is facing toward the center. The panning base of the second panning clamp may be secured to prevent rotation. The second panning clamp is opened enough so that the nodal slide can slide into the second panning clamp, and secured to the second panning clamp. The camera is aligned in the nodal slide's clamp. The nodal slide is moved fore or aft until it is aligned with the nodal point, and secured in place. The horizontal rail may likewise be aligned with the nodal point, and secured in place.

Figure 5:
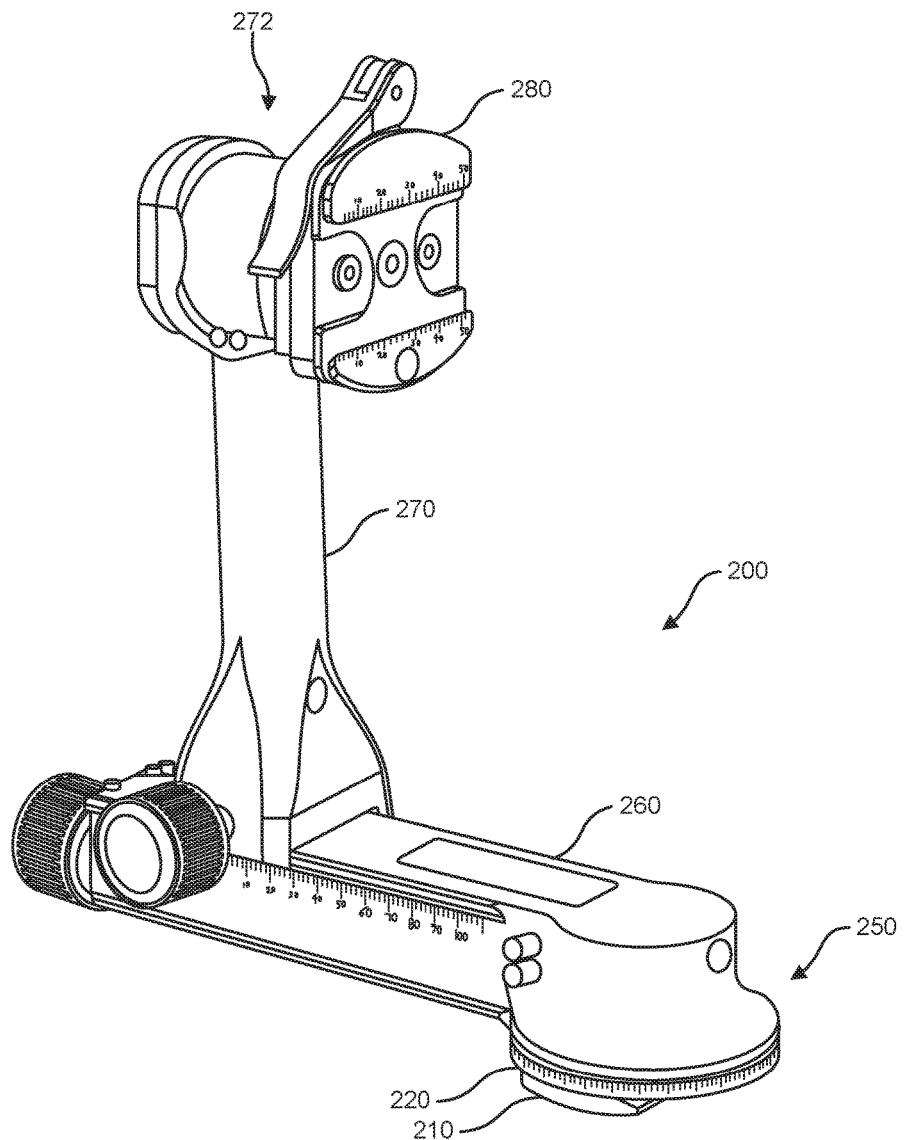
FIG. 5 illustrates another panoramic gimbal device.
Figure 6:
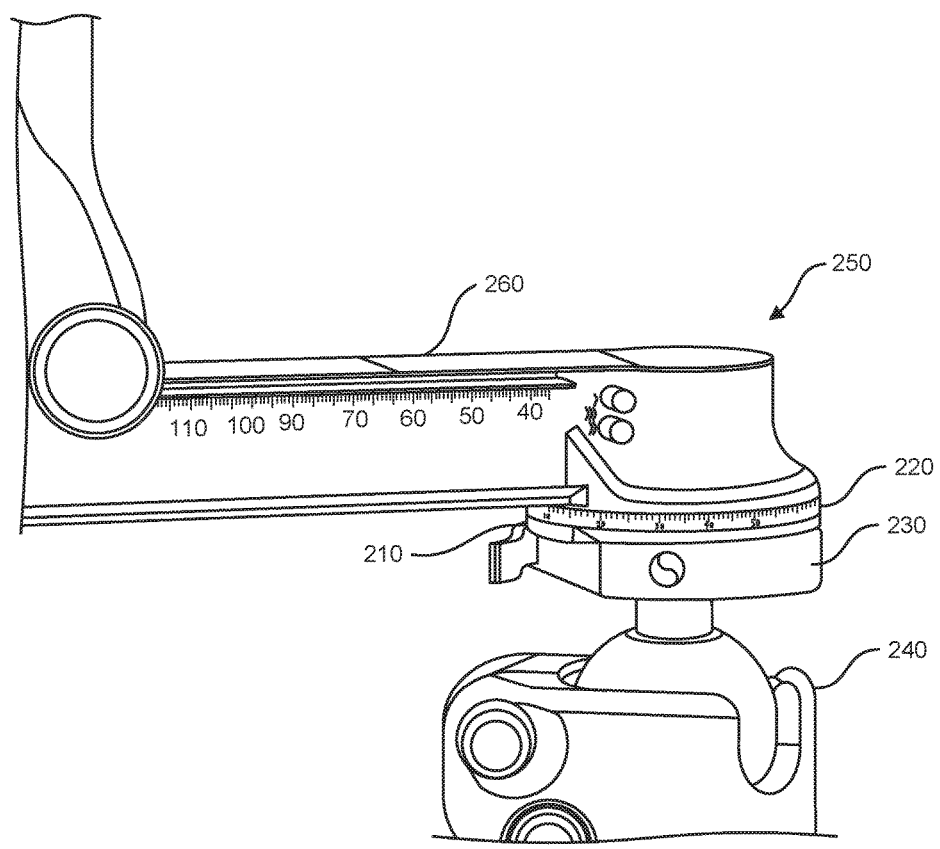
FIG. 6 illustrates a portion of the gimbal device of FIG. 5.
Figure 7:
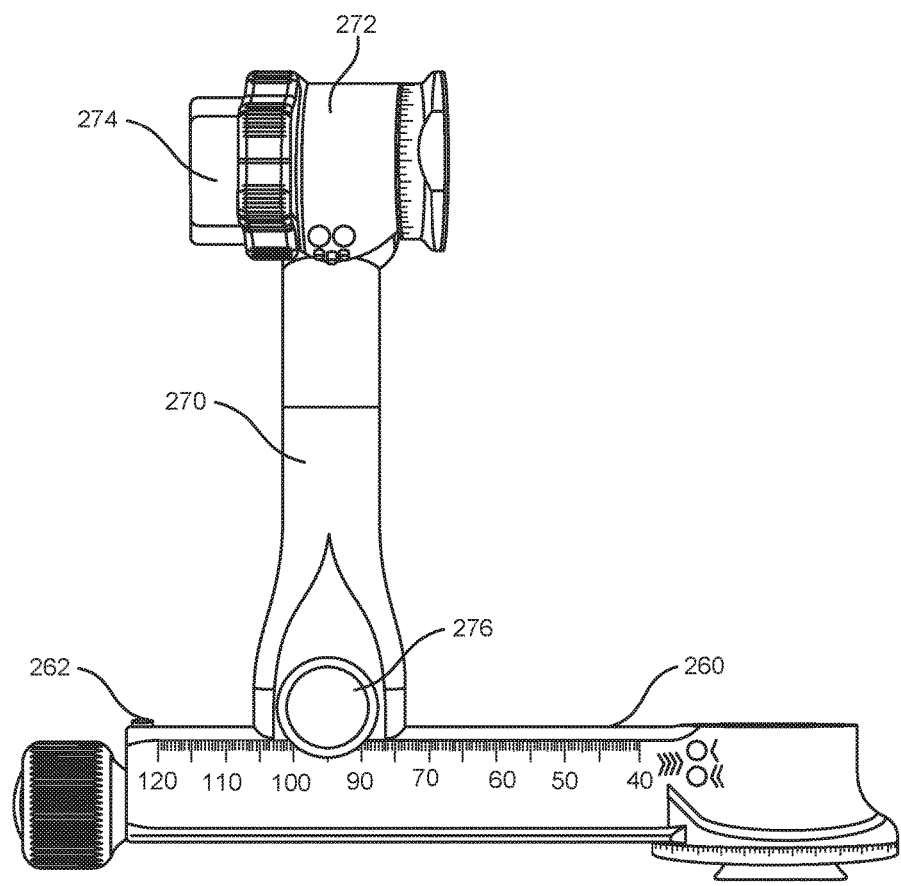
FIG. 7 illustrates a side view of the gimbal device of FIG. 5.

While the panoramic gimbal device 100 illustrated in FIG. 1 is functional the adjustments are time consuming and the multitude of separate components are cumbersome. Referring to FIG. 5, another embodiment of a panoramic gimbal device 200 includes a plate 210 secured to a lower base 220 of a panning assembly 250. Referring also to FIG. 6, the plate 210 may be secured to the clamp jaw of a quick release clamp 230 supported by a ball head 240 of a tripod (not shown). The panning assembly 250 horizontally rotatably interconnects the lower base 220 to a horizontal arm 260. Referring also to FIG. 7, the horizontal arm 260 includes a pair of opposing grooves 262 that detachably engage with a clamp 276 of a vertical rail 270. The vertical rail 270 is adjustable in its horizontal position along the horizontal rail 260. The vertical rail 270 includes a rotatable assembly 272 that rotates in a direction parallel to the vertical rail 270 and may be selectively secured from rotation by a lever 274. A quick release clamp 280 may be secured to the rotatable assembly 272. The quick release clamp 280 may include clamp jaws that may selectively secure to a quick release plate of an imaging device by using a lever. The horizontal arm 260 may be rotated to align the lens of the camera with the scene to have an image captured. Also, the rotatable assembly may be rotated so that the lens of the camera is aligned with the scene to have the image captured. Also, the horizontal rail may be adjusted so that the image sensor is in a suitable location, such as directly above the tripod supporting the panoramic gimbal device to reduce or otherwise eliminate the parallax. While the panoramic gimbal device 200 of FIG. 5 is less cumbersome than the panoramic gimbal device 100 of FIG. 1, it remains a bulky and heavy device thus making image acquisition problematic.

Figure 8:
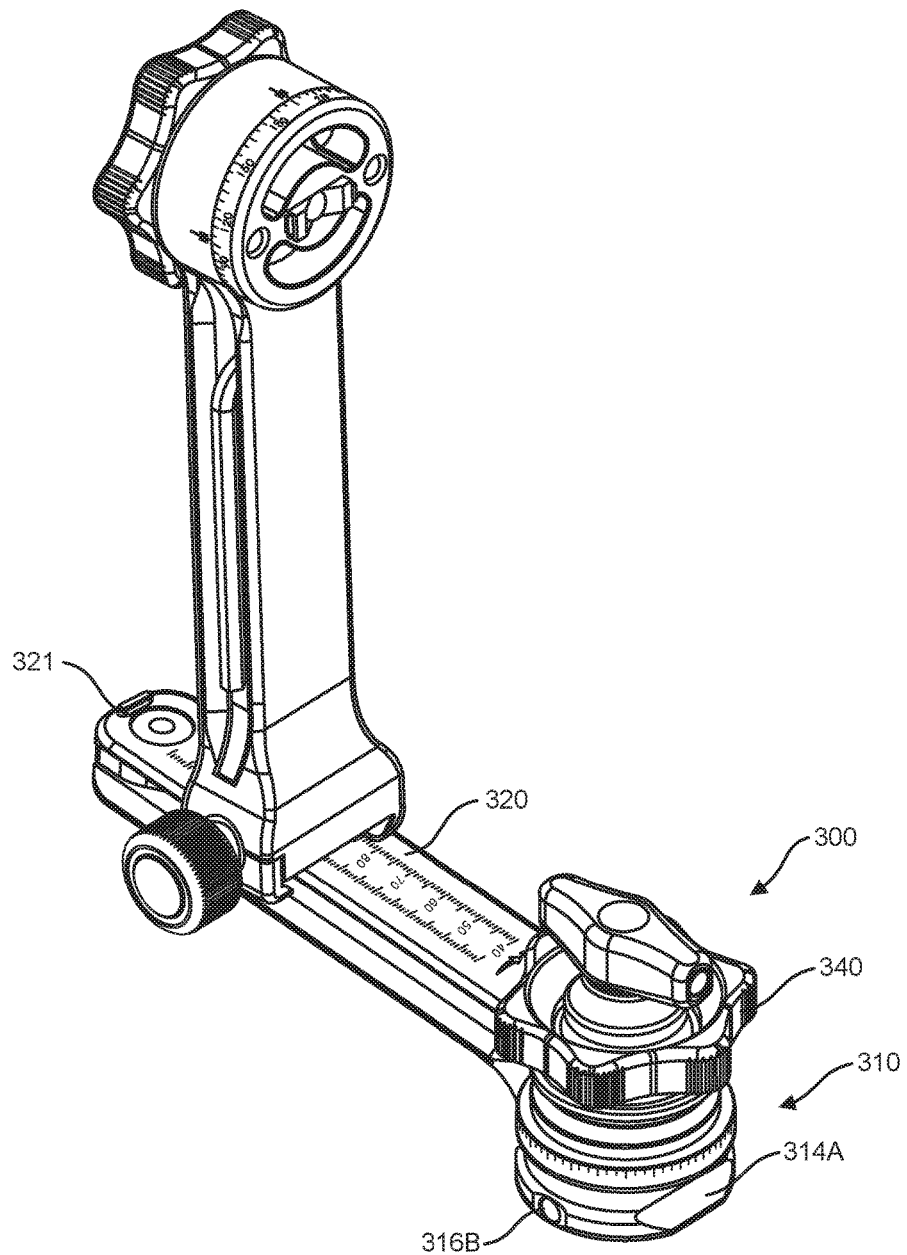
FIG. 8 illustrates an isometric view of another panoramic device.
Figure 9:
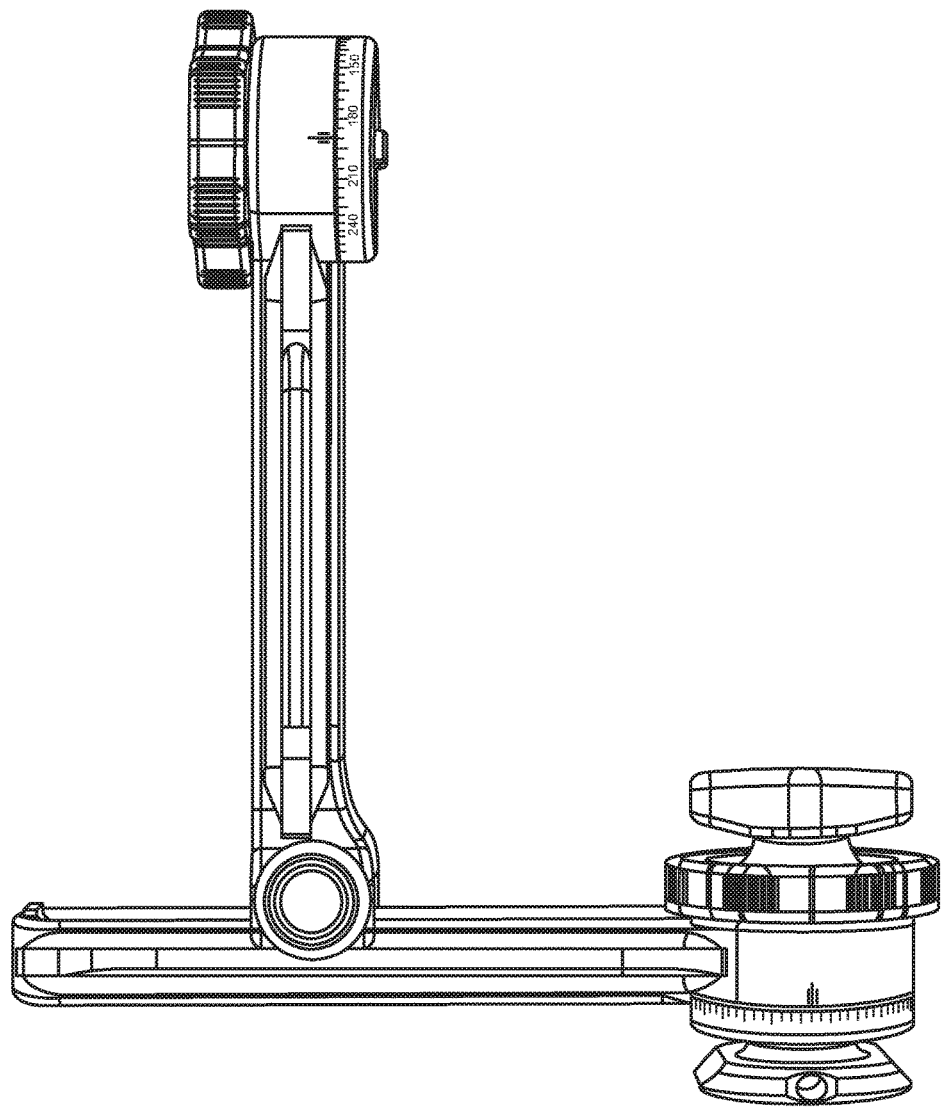
FIG. 9 illustrates a front view of the panoramic device of FIG. 8.
Figure 10:
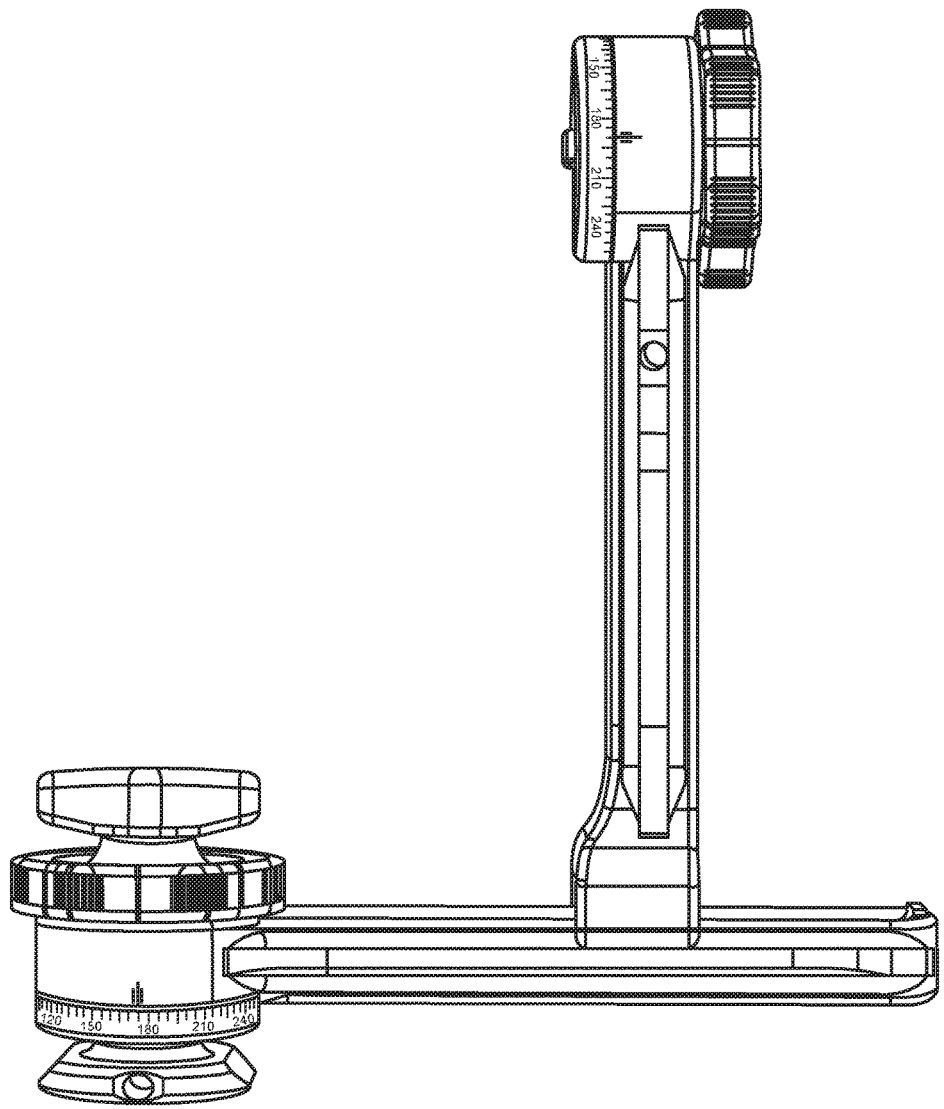
FIG. 10 illustrates a back view of the panoramic device of FIG. 8.
Figure 11:
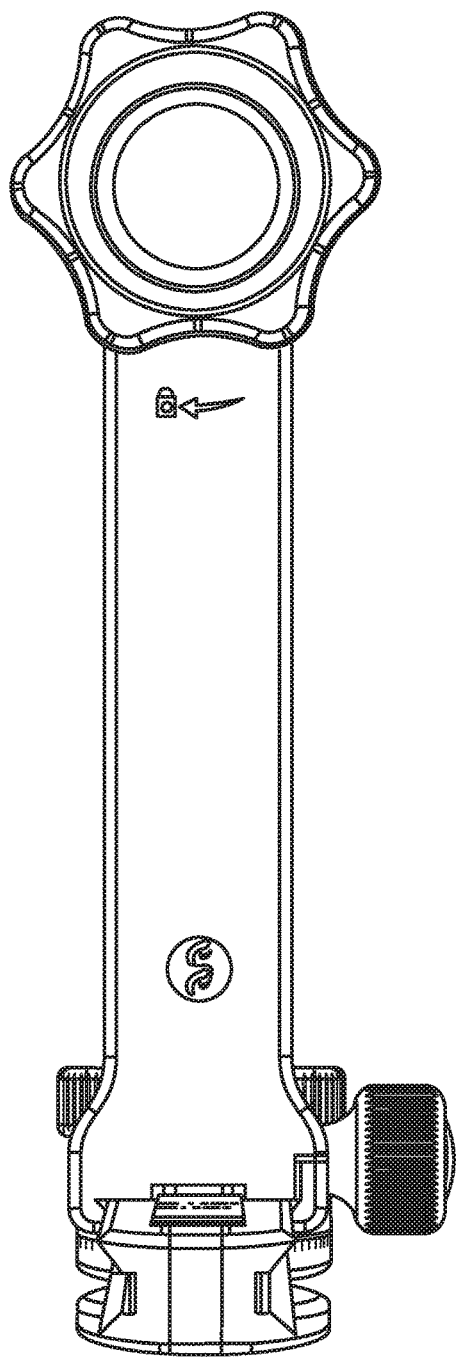
FIG. 11 illustrates a left view of the panoramic device of FIG. 8.
Figure 12:
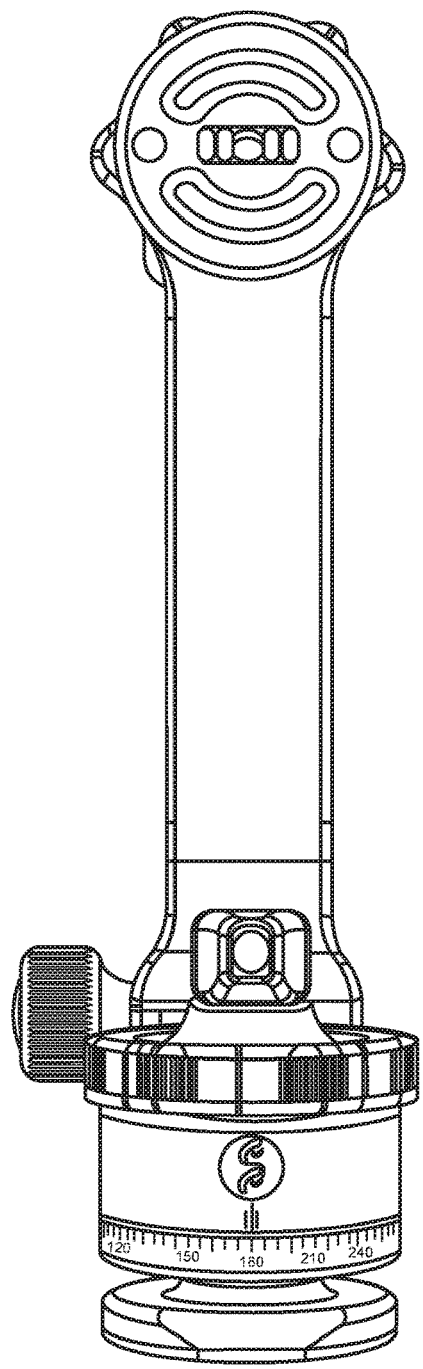
FIG. 12 illustrates a right view of the panoramic device of FIG. 8.
Figure 13:
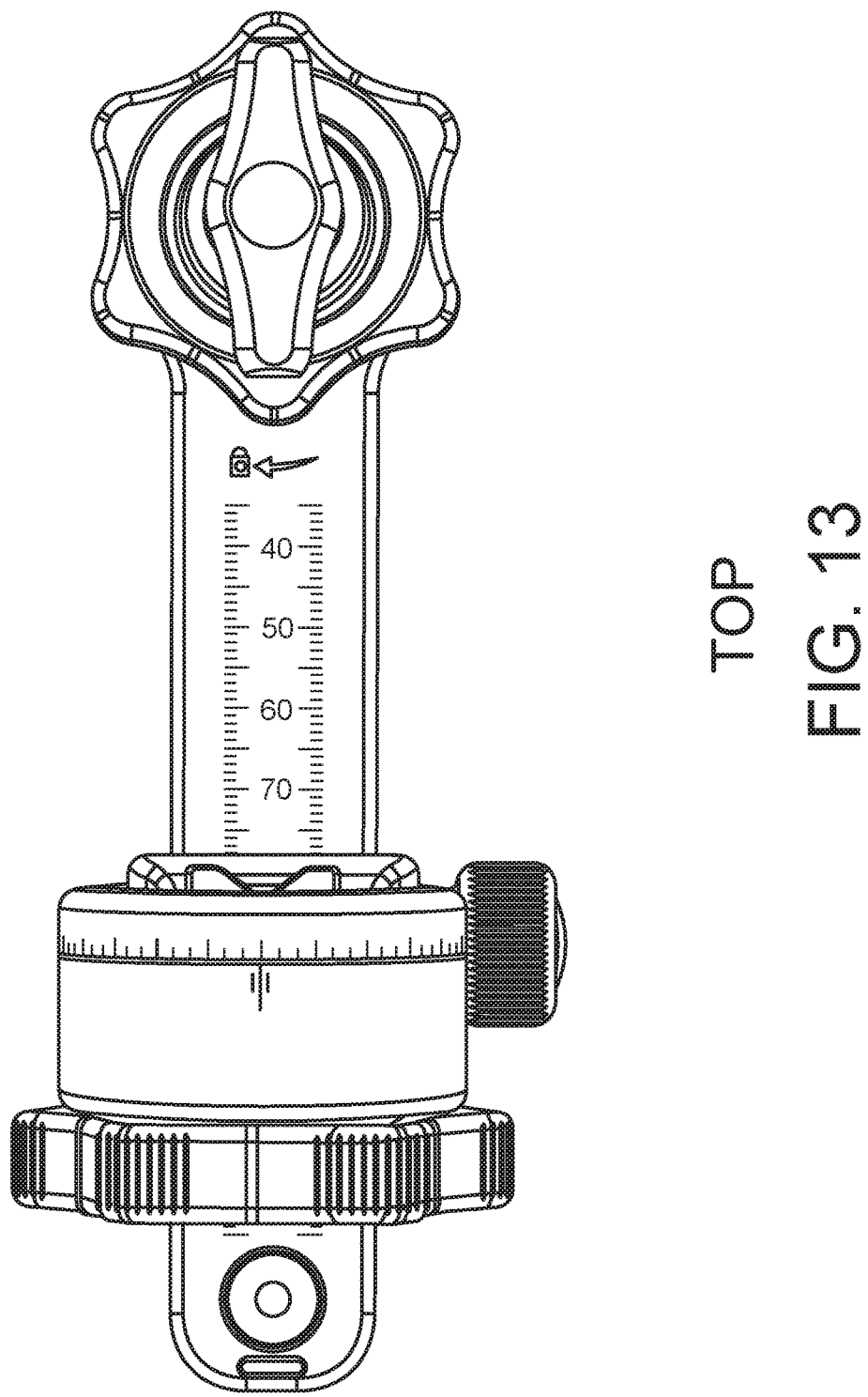
FIG. 13 illustrates a top view of the panoramic device of FIG. 8.
Figure 14:
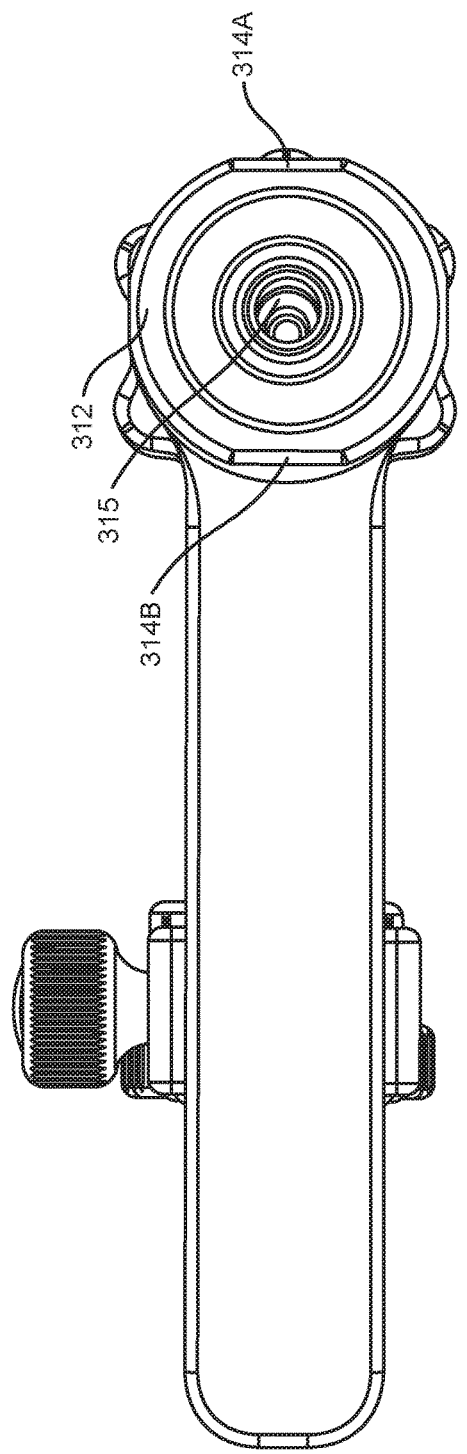
FIG. 14 illustrates a bottom view of the panoramic device of FIG. 8.
Figure 15:
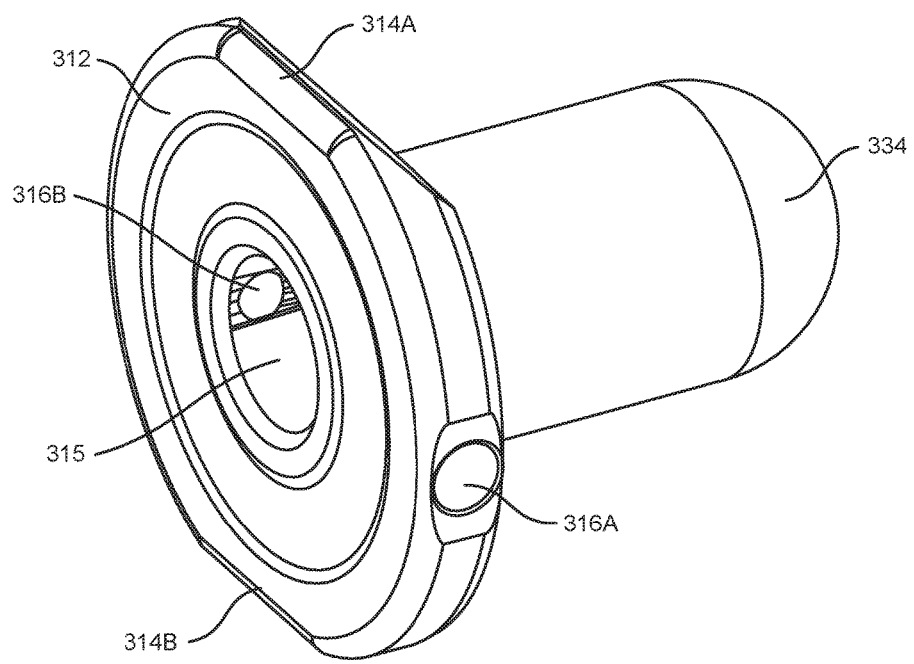
FIG. 15 illustrates a lower base of the panoramic device of FIG. 8.

Referring to FIG. 8, an isometric view of another panoramic gimbal device 300 is illustrated. The panoramic gimbal device 300 may omit the gimbal, as desired. FIG. 9 illustrates a front view of the panoramic gimbal device 300 of FIG. 8. FIG. 10 illustrates a back view of the panoramic gimbal device 300 of FIG. 8. FIG. 11 illustrates a left view of the panoramic gimbal device 300 of FIG. 8. FIG. 12 illustrates a right view of the panoramic gimbal device 300 of FIG. 8. FIG. 13 illustrates a top view of the panoramic gimbal device 300 of FIG. 8. FIG. 14 illustrates a bottom view of the panoramic gimbal device 300 of FIG. 8. The panoramic gimbal device 300 includes a panoramic structure 310 at a first end of a horizontal rail 320. The horizontal rail may include a level bubble therein so that it may be adjusted to be level. Referring also to FIG. 14 and FIG. 15, the panoramic structure 310 includes a lower base 312. The lower base 312 includes a pair of opposed inclined surfaces 314A, 314B, which are suitable to be secured to clamp jaws of a clamp. The lower base 312 may define a threaded opening 315 in the central lower base. The lower base 312 may be rotatably interconnected with a screw of a ball head and/or a tripod to be secured thereto. The lower base may omit the inclined surfaces, if desired. The lower base may omit the threaded opening, if desired. Other securement structures may likewise be used, if desired. The lower base 312 is tightly secured to a screw by gripping the lower base 312 and applying rotational force to the lower base 312 in a first direction. The lower base 312 is unsecured by gripping the lower base 312 and applying rotational force to the lower base 312 in a second direction. The lower base 312 may also include a pair of openings 316A, 316B in the sides thereof. An allen key or other elongate member may be inserted through one or both of the openings 316A, 316B and used to apply a rotational force to the lower base 312 in the first direction which substantially increases the likelihood of obtaining a secure engagement between the lower base 312 and the screw of the ball head and/or tripod. The alien key or other elongate member may be inserted through one or both of the openings 316A, 316B and used to apply a rotational force to the lower base 312 in the second direction which more readily unsecures the engagement between the lower base 312 and the screw of the ball head and/or tripod.

Figure 16:
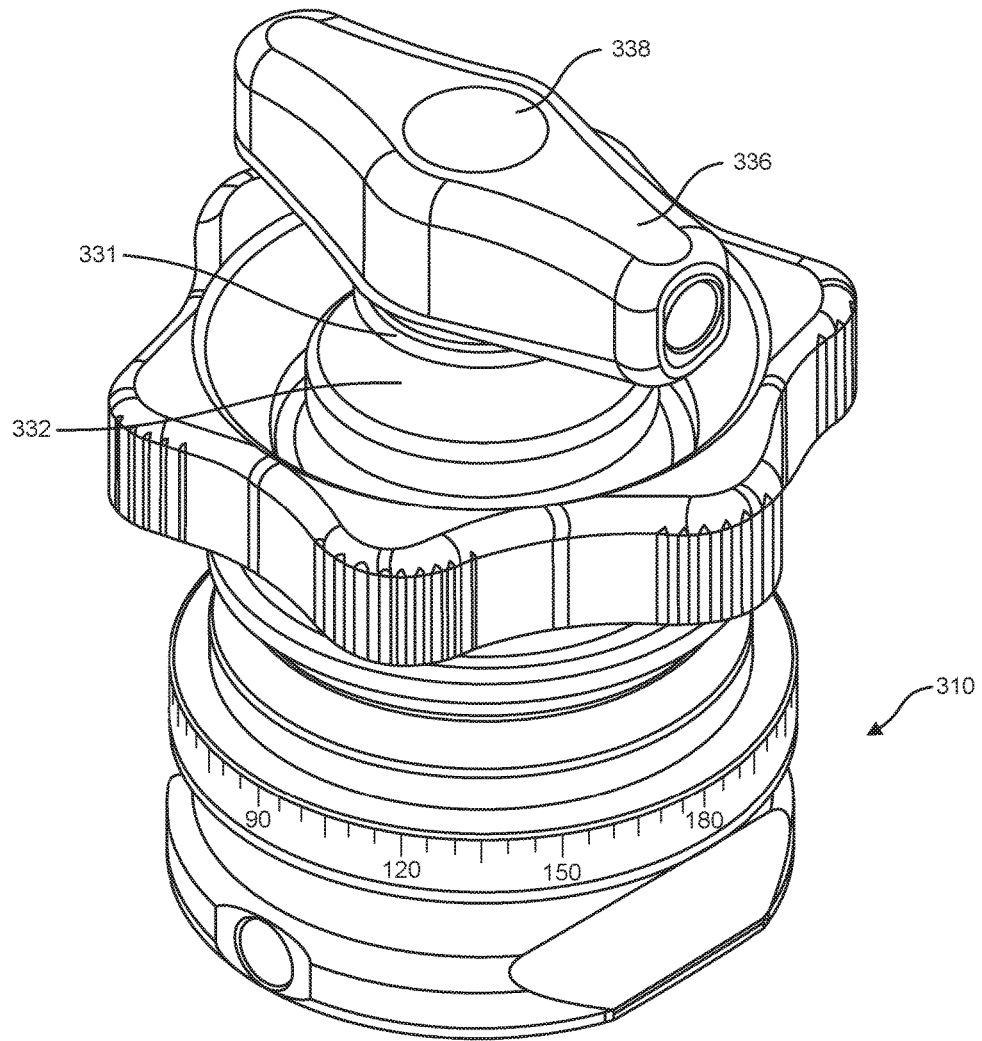
FIG. 16 illustrates a leveling base of the panoramic device of FIG. 8.
Figure 17:
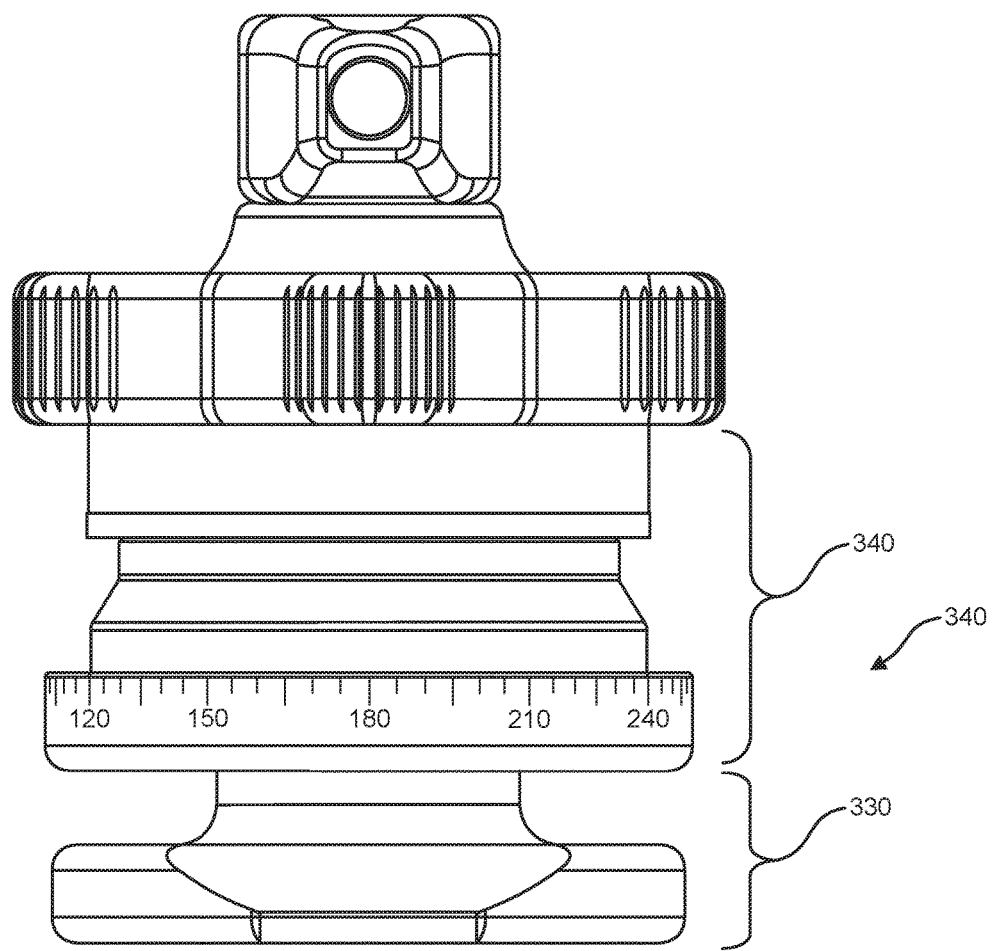
FIG. 17 illustrates another view of the leveling base of the panoramic device of FIG. 8.
Figure 18:
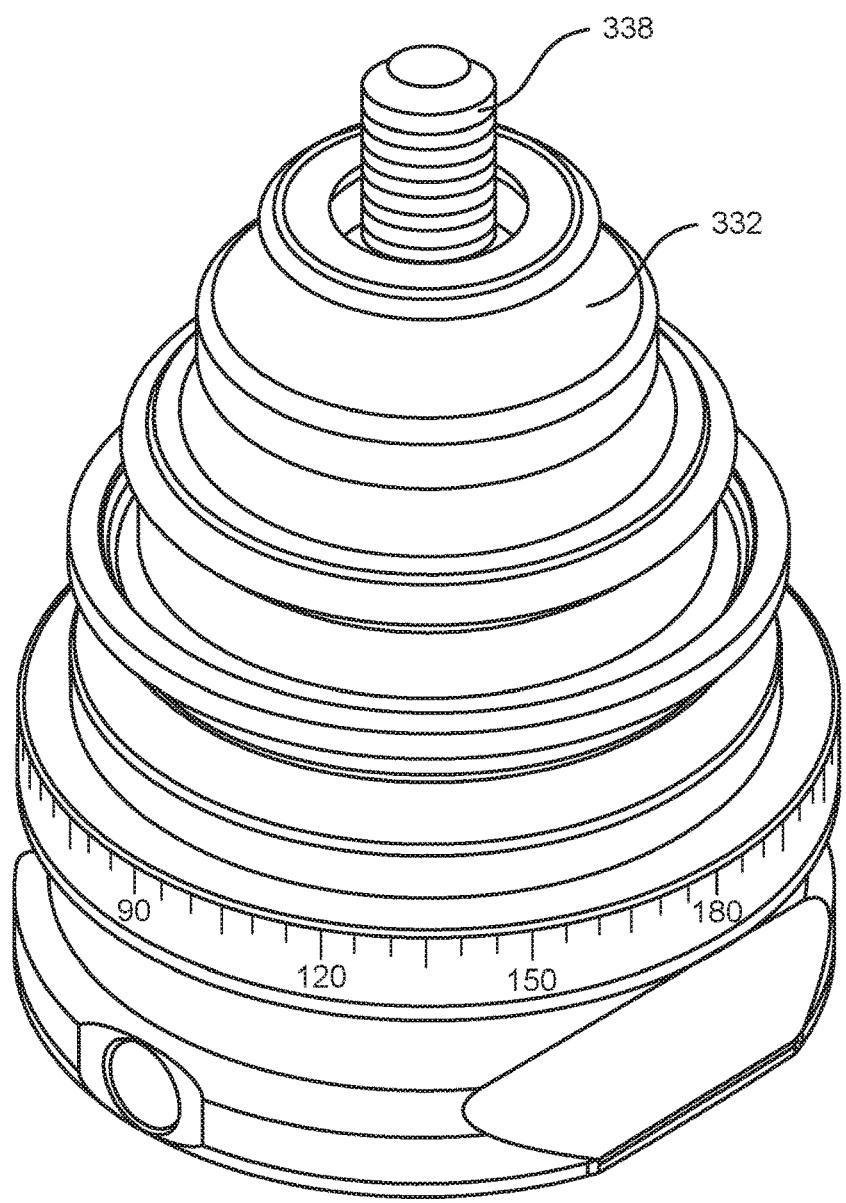
FIG. 18 illustrates a view of a portion of the leveling base of the panoramic device of FIG. 8.
Figure 19:
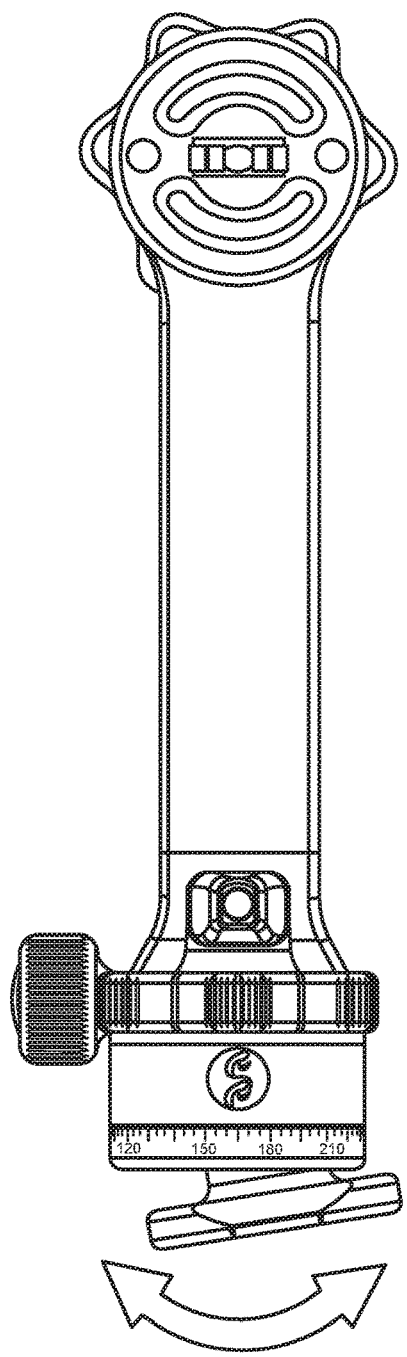
FIG. 19 illustrates a rotated leveling base of the panoramic device of FIG. 8.
Figure 20:
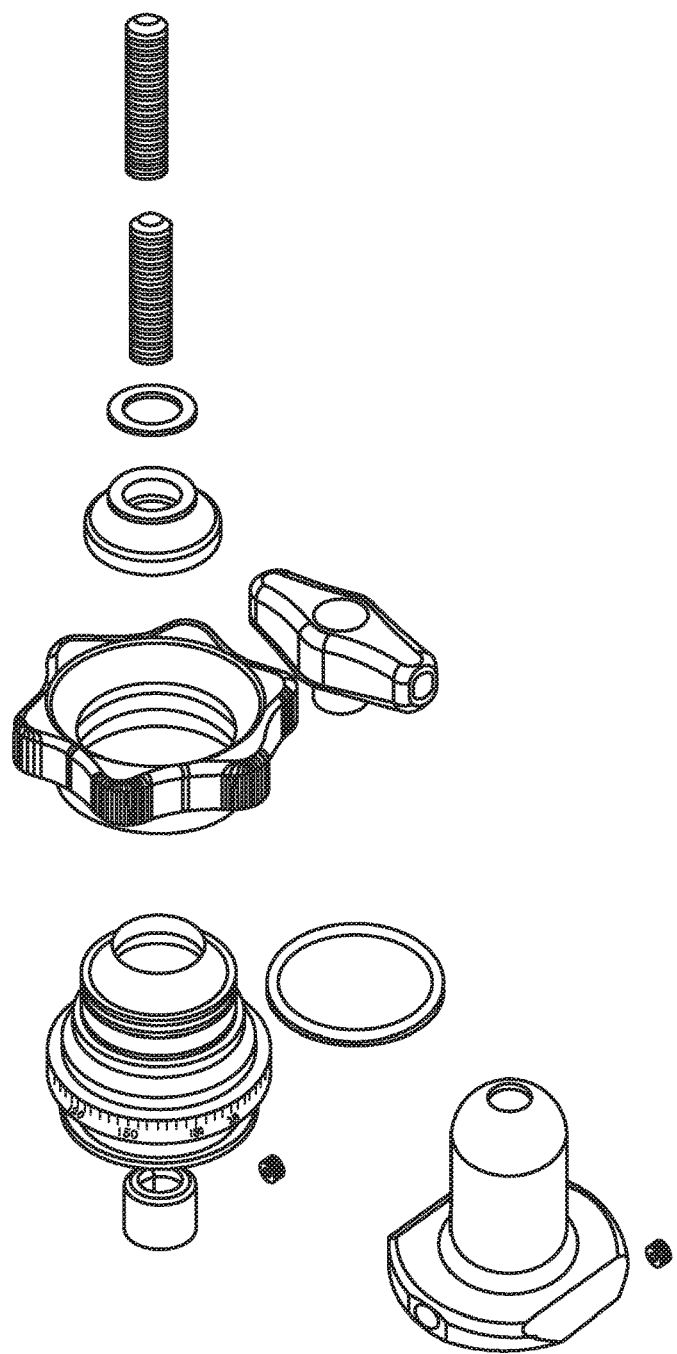
FIG. 20 illustrates an exploded view of the leveling base of the panoramic device of FIG. 8.

Referring to FIG. 8, FIG. 16, and FIG. 17, the panoramic structure 310 may include a leveling base 330. The leveling base 330 may be rotated in a non-coplanar manner relative to a panning structure 340. For example, the leveling base 330 may be rotated up to +/−15 degrees or more relative to the panning structure 340. The leveling base 330 may include an upper cone member 332 (see FIG. 16) and a washer 331 that is supported on the upper cone shaped member 334 of the lower base (see FIG. 15). The upper cone shaped member 334 and the upper cone member 332 may be selectively secured against movement by tightening a wing knob 336 attached to a threaded screw 338 (see FIG. 18) that passes through the leveling base 330 to the lower portion thereof to selectively secure the assembly against tilting. Other structures may likewise be used to include a selectively securable tiltable base with respect to the horizontal rail. Preferably, the threaded screw 338 has a hollow interior that is secured to the wing knob 336 which is rotatably engaged with another screw affixed to the lower portion of the leveling base 330. Referring to FIG. 19, the leveling base 330 is illustrated with an offset non-coplanar angular rotation so that the horizontal rail 320 is preferably horizontal and level. FIG. 20 illustrates one exemplary embodiment of an exploded view of the panoramic structure 310.

The wing knob 336 may be rotatably interconnected with the threaded screw 338 of leveling base 330. The wing knob 336 is tightly secured by gripping the leveling base 330 and applying rotational force to the wing knob 336 in a first direction. The wing knob 336 is unsecured by gripping the leveling base 330 and applying rotational force to the wing knob 336 in a second direction. The wing knob 336 may also include a pair of openings 338A, 338B in the ends thereof. The alien key or other elongate member may be inserted through one or both of the openings 338A, 338B and used to apply a rotational force to the wing knob 336 in the first direction which substantially increases the likelihood of obtaining a secure engagement of the level base 312 of the leveling base 330 so that it may not freely move. The allen key or other elongate member may be inserted through one or both of the openings 318A, 318B and used to apply a rotational force to the wing knob 336 in the second direction which more readily unsecures the engagement of the level base 312 of the leveling base 330 so that it may freely move.

Figure 21:
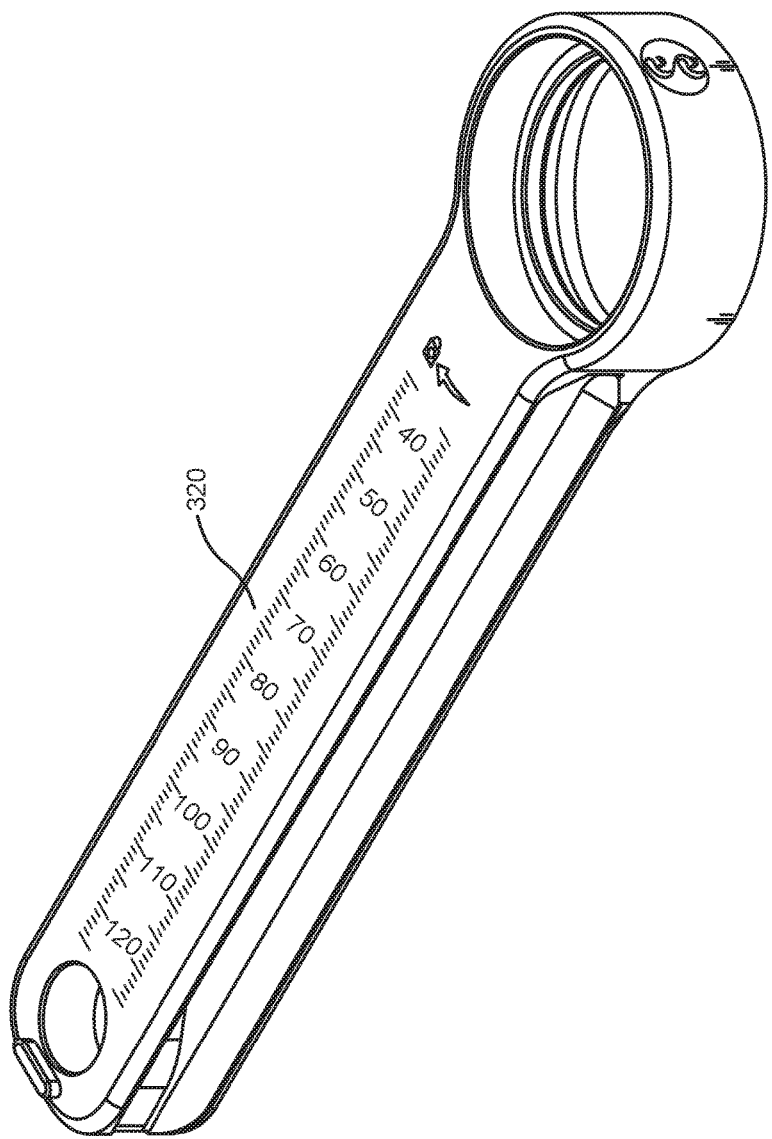
FIG. 21 illustrates a horizontal rail of the panoramic device of FIG. 8.

Referring to FIG. 8 and FIG. 21, the horizontal rail 320 is rotatably interconnected with the panoramic structure 310. The horizontal rail 320 is rotated to a desired position and then a rotatable locking member 340 is turned in a first direction to selectively engage the horizontal rail 320 to secure the horizontal rail 320 from rotation. The rotatable locking member 340 is turned in a second direction to selectively disengage the horizontal rail 320 to unsecure the horizontal rail 320 so that it may freely rotate. Other selective locking mechanisms (e.g., inhibit rotational movement to a greater or lesser degree) for the horizontal rail may likewise be used, as desired.

Figure 22:
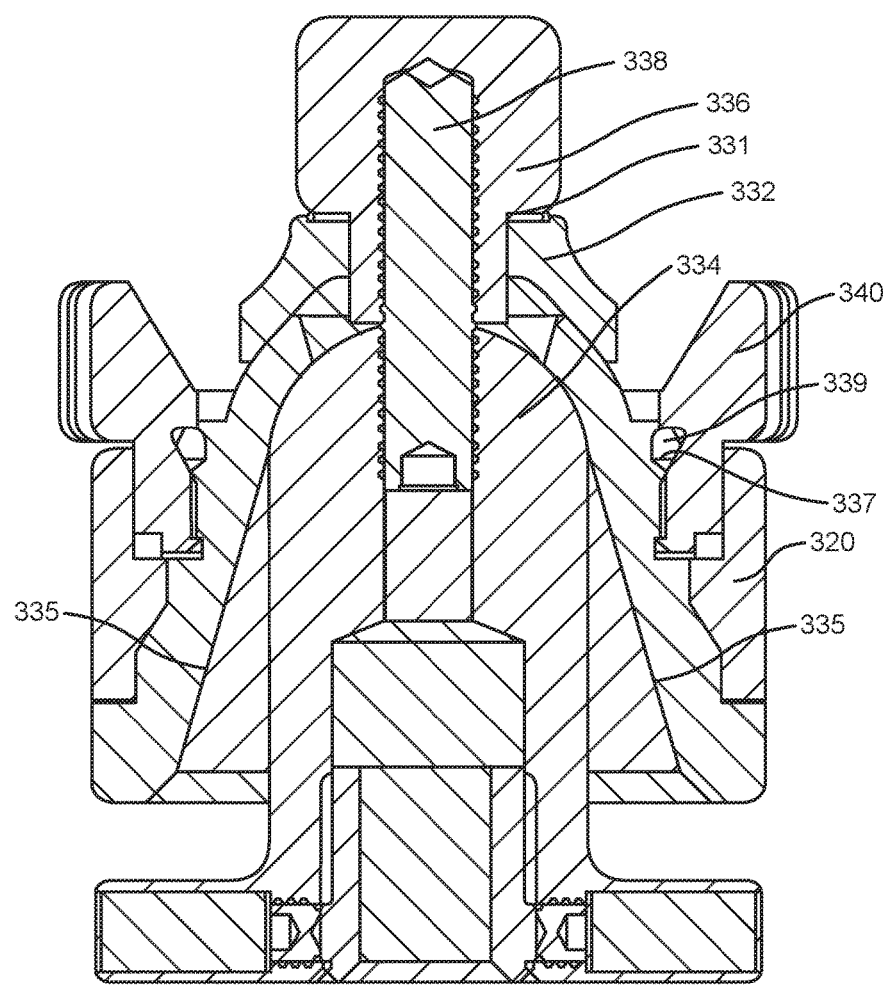
FIG. 22 illustrates a cross sectional view of the leveling base of FIG. 8.

Referring also to FIG. 22, a cross sectional view of the leveling base 330 is illustrated. The leveling base 330 may include a compressible O-ring 339 at a position between the rotatable locking member 340 and an interior surface 337 of the leveling base 330. As the locking member 340 is rotated in a manner to release the horizontal rail 320 the locking member 340 will increasingly compress the O-ring 339 which will inhibit the rotation of the locking member 340. This increased inhibition acts to decrease the likelihood that the locking member 340 will become inadvertently detached. With increasingly inhibited rotation of the locking member 340 by the O-ring 339, it will further compress as the locking member 340 is rotated past the O-ring 339 and thus removable from the leveling base 330. Other structures may likewise be used that selectively increase the resistance to removal of a horizontal rail locking mechanism, that may be selectively overcome, such as with increased applied force, if desired.

With the O-ring 339 being at a position between the rotatable locking member 340 and the interior surface 337 of the leveling base 330, it also provides at least a partial isolation between the rotatable locking member 340 and the horizontal rail 320. In this manner, the O-ring 339 inhibits the rotation of the rotatable locking member 340 when the horizontal rail 320 is rotated. Accordingly, the horizontal rail 320 may be rotated, or otherwise rotated in circles, while the rotatable locking member 340 does not rotate as much as the horizontal rail 320 or otherwise preferably is free from any substantial rotation with the horizontal rail 320. This inhibits the rotatable locking member 340 from being inadvertently detached from the leveling base 330 as a result of the movement of the horizontal rail 320. Other structures may likewise be used that selectively inhibit the rotation of the locking member along with the rotation of the horizontal rail. Preferably, the same structure is used to inhibit both the rotation of the locking member along with the rotation of the horizontal rail, and to selectively increase the resistance to removal of the horizontal rail locking mechanism.

The upper cone shaped member 334 preferably has a curved exterior surface that is smooth. In addition, the interior of the leveling base 330 preferably has a smooth tapered surface 335 that is suitable to engage with the curved exterior surface of the upper cone shaped member 334. With the tapered interior surface 335, the upper cone shaped member 335 provides an increased locking ability with the wing knob 338 secured in a locked position. This provides increased stability to the imaging device, even under challenging conditions, such as high winds.

Figure 23:
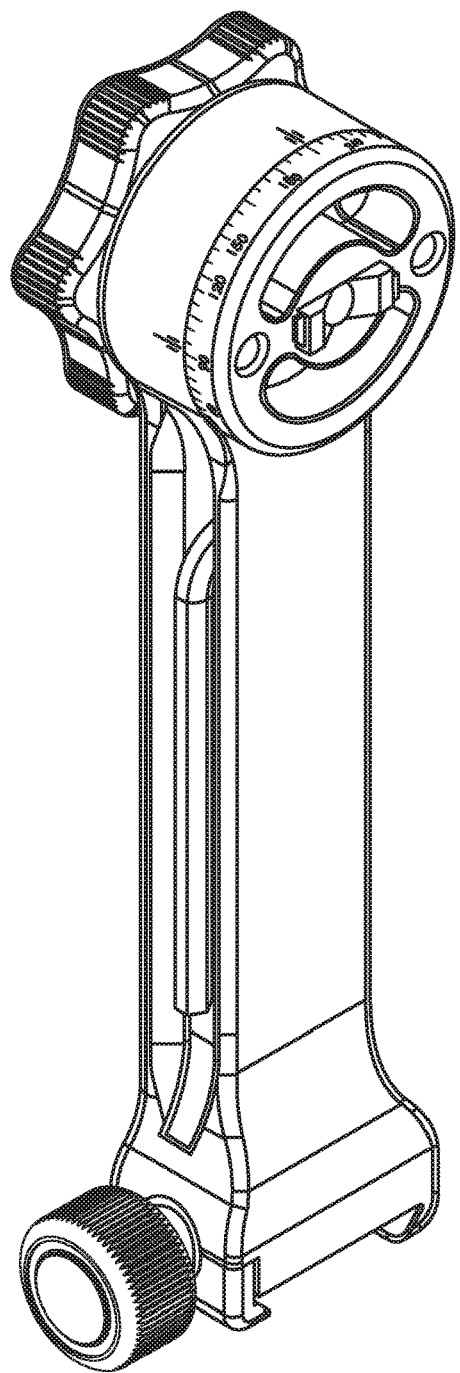
FIG. 23 illustrates a vertical rail assembly of the panoramic device of FIG. 8.
Figure 24:
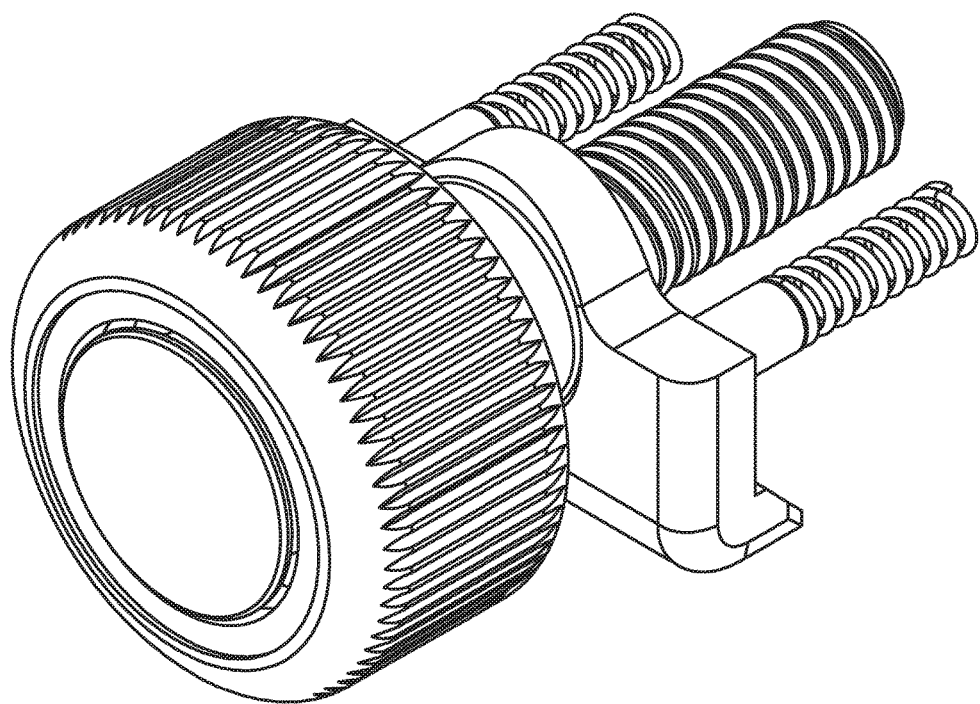
FIG. 24 illustrates a knob assembly for the vertical rail of the panoramic device of FIG. 8.
Figure 25:
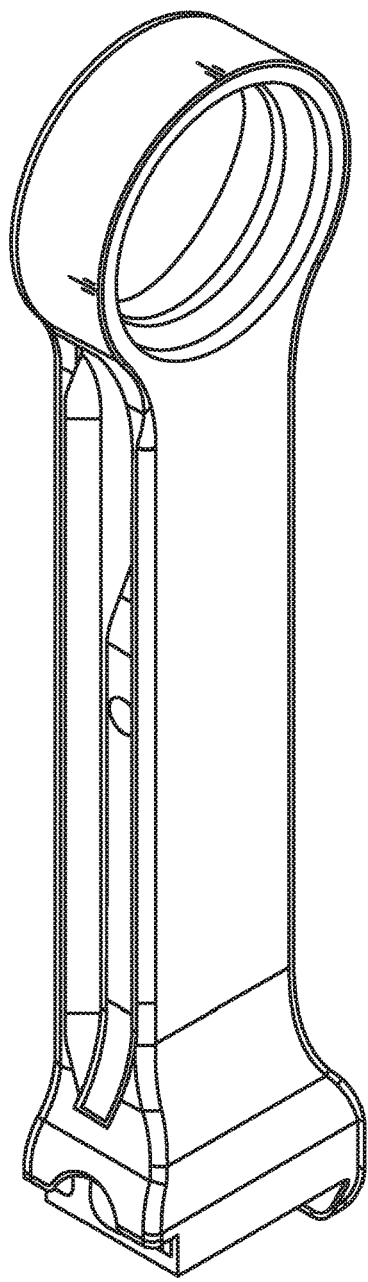
FIG. 25 illustrates a vertical rail of the panoramic device of FIG. 8.

Referring to FIG. 23, the vertical rail includes a screw based clamping assembly at the lower portion thereof. The horizontal rail includes a flair in its groove, so that when the vertical rail is attached thereto it does not inadvertently slide off the end of the horizontal rail. Alternatively, or in addition thereto, the upper rail may include a raised protrusion 321 that inhibits the vertical rail from inadvertently slide off the end of the horizontal rail. The rearward portion of the vertical rail may include a matching notch (see FIG. 11) to receive the protrusion 321, if desired. Referring also to FIG. 24, the clamping assembly at the lower portion thereof may include a knob with a screw attached thereto. The screw may be rotatably interconnected with the vertical rail so that a portion of the clamp assembly may be interconnected with the groove of the horizontal rail. A pair of springs may be used to be bias a portion of the clamp assembly outwardly. Referring also to FIG. 25, the vertical rail may include a portion of clamp assembly integrally integrated therewith to increase the stability of the vertical rail. The horizontal rail and/or vertical rail may include other structures to inhibit the vertical rail from being capable of sliding off the horizontal rail when the clamp is only slightly loosened.

Figure 26:
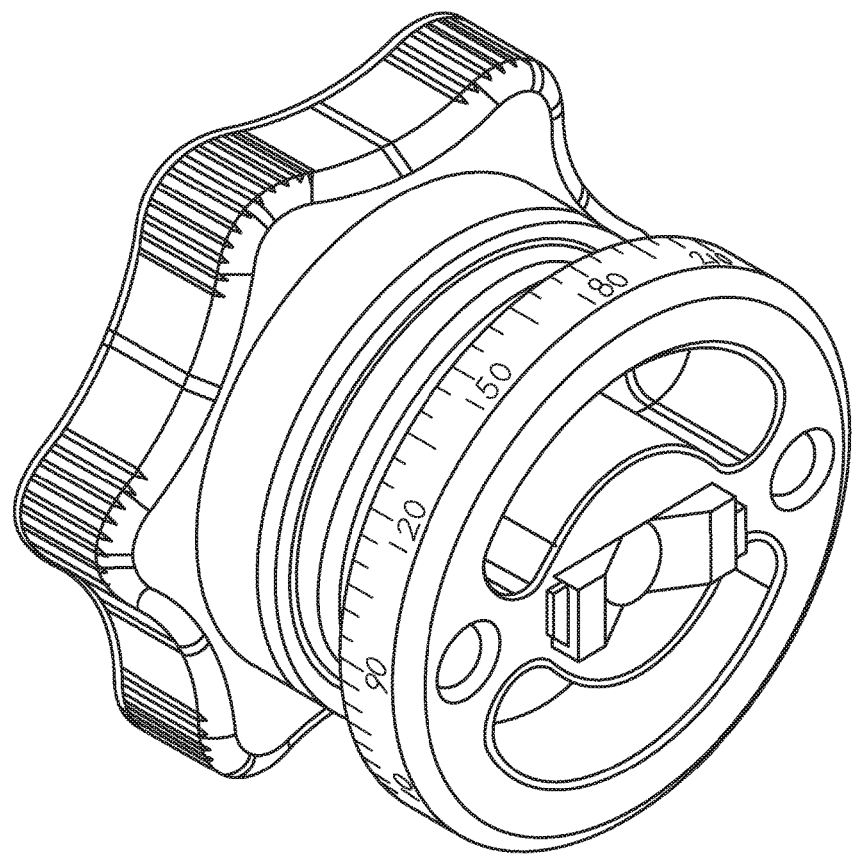
FIG. 26 illustrates a knob assembly of the panoramic device of FIG. 8.
Figure 27:
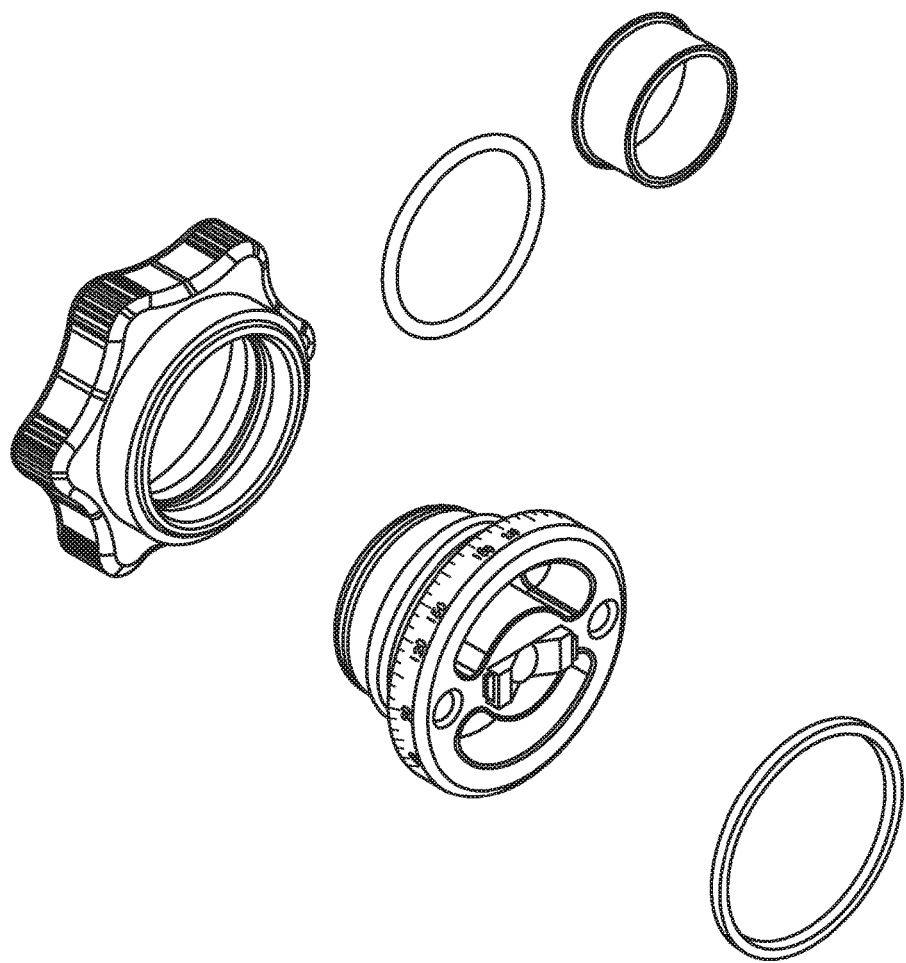
FIG. 27 illustrates an exploded view of the knob assembly of the panoramic device of FIG. 8.

Referring to FIG. 25 and FIG. 26 and FIG. 27, the vertical rail may include an upper portion with a circular ring that supports an upper panoramic assembly that may include an upper rail knob assembly. The upper knob of the upper rail knob assembly rotates the knob assembly, including any imaging device directly connected thereto, in a direction co-planar to the upper rail. With the imaging device positioned in a desirable orientation, the upper knob may be tightened to secure the upper rail knob assembly from rotation. When it is desirable to adjust the imaging device, the upper knob may be loosened to unsecure the imaging device from its current orientation. Preferably a clamp, arm, or otherwise is affixed to the upper panoramic assembly to support the imaging device.

Figure 28:
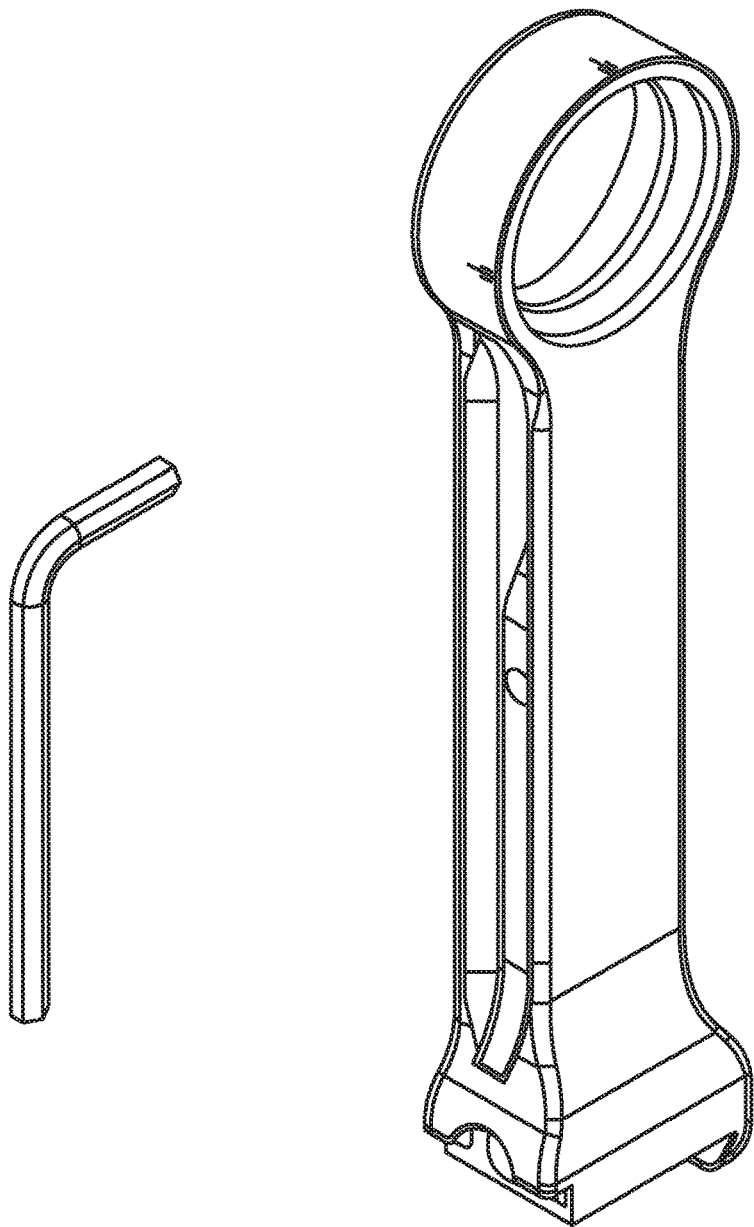
FIG. 28 illustrates a hex key for the vertical rail of the panoramic device of FIG. 8.

Referring to FIG. 28, the vertical rail may define an opening therein to support the alien key therein. Also, the opening may support a magnet so that the alien key is detachably engaged within the opening. In this manner, the alien key is readily available.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. An imaging device assembly comprising:
   (a) a first rotatable assembly supportable by a support that rotates in a generally horizontal plane and a horizontal locking member suitable to selectively impede said rotation of said first rotatable assembly;
   (b) a second rotatable assembly that rotates in a generally vertical plane;
   (c) an interconnection structure that interconnects said first rotatable assembly to said second rotatable assembly such that said second rotatable assembly is rotatable around said first rotatable assembly at an elevation higher than said first rotatable assembly and offset laterally from said first rotatable assembly;
   (d) said first rotatable assembly including a panning structure that rotates said support in said generally horizontal plane and a leveling base that is rotatable in a non-coplanar manner relative to said panning structure.

2. The imaging device assembly of claim 1 wherein said first rotatable assembly includes a pair of opposed inclined edges suitable to be secured to jaws of a clamp.

3. The imaging device assembly of claim 1 wherein said first rotatable assembly includes a threaded opening therein in a vertical orientation suitable to be secured to a threaded member supported by a tripod.

4. The imaging device assembly of claim 3 wherein said first rotatable assembly includes pair of opposed openings therein in a horizontal direction suitable to receive an elongate member there through to rotate said first rotatable assembly to selectively secure to said threaded member and selectively unsecure from said threaded member.

5. The imaging device assembly of claim 1 wherein said leveling base includes an upper cone shaped base member.

6. The imaging device assembly of claim 5 wherein said panning structure includes an upper cone shaped panning member.

7. The imaging device assembly of claim 6 wherein said upper cone shaped base member and said upper cone shaped panning member are suitable to being engaged with one another.

8. The imaging device assembly of claim 1 wherein said upper cone shaped base member and said upper cone shaped panning member are engaged with one another in a manner that varies the force required to modify the orientation of said panning base with respect to said leveling base in a non-coplanar manner.

9. The imaging device assembly of claim 8 wherein said varies the force is as a result of selectively rotating a knob.

10. The imaging device assembly of claim 9 wherein said knob includes an opposing pair of openings therein.

11. The imaging device assembly of claim 1 wherein said horizontal locking member encircles said first rotatable assembly.

12. The imaging device assembly of claim 11 wherein said horizontal locking member engaged with a compressible O-ring.

13. The imaging device assembly of claim 7 wherein said leveling base includes an upper cone shaped base member having a tapered angle.

* * * * *